US012000147B2

(12) United States Patent
Gillette et al.

(10) Patent No.: US 12,000,147 B2
(45) Date of Patent: Jun. 4, 2024

(54) APPARATUS AND SYSTEM FOR DYNAMIC ACOUSTIC LOCKING CEILING SYSTEM AND METHODS THEREOF

(71) Applicant: Turf Design, Inc., Gilberts, IL (US)

(72) Inventors: Jason Gillette, Chicago, IL (US); Kuan-Wen Chiu, Chicago, IL (US)

(73) Assignee: Turf Design, Inc., Gilberts, IL (US)

( * ) Notice: Subject to any disclaimer, the term of this patent is extended or adjusted under 35 U.S.C. 154(b) by 0 days.

(21) Appl. No.: 18/120,225

(22) Filed: Mar. 10, 2023

(65) Prior Publication Data

US 2023/0212851 A1 Jul. 6, 2023

Related U.S. Application Data

(63) Continuation of application No. 16/792,573, filed on Feb. 17, 2020, now Pat. No. 11,603,661, which is a continuation of application No. 15/639,572, filed on Jun. 30, 2017, now Pat. No. 10,584,488.

(60) Provisional application No. 62/357,066, filed on Jun. 30, 2016, provisional application No. 62/357,026, filed on Jun. 30, 2016, provisional application No.
(Continued)

(51) Int. Cl.

| | |
|---|---|
| ***E04B 9/00*** | (2006.01) |
| ***E04B 1/84*** | (2006.01) |
| ***E04B 9/04*** | (2006.01) |
| ***E04B 9/06*** | (2006.01) |
| ***G10K 11/162*** | (2006.01) |
| ***G10K 11/168*** | (2006.01) |

(Continued)

(52) U.S. Cl.
CPC ................ *E04B 9/001* (2013.01); *E04B 1/84* (2013.01); *E04B 9/0414* (2013.01); *E04B 9/045* (2013.01); *G10K 11/162* (2013.01); *G10K 11/168* (2013.01); *E04B 2001/829* (2013.01); *E04B 9/064* (2013.01); *E04B 9/366* (2013.01)

(58) Field of Classification Search
CPC ........ E04B 9/001; E04B 9/0414; E04B 9/045; E04B 9/064; E04B 9/225; E04B 1/84; G10K 11/162; G10K 11/168
See application file for complete search history.

(56) References Cited

U.S. PATENT DOCUMENTS 1,942,662 A 1/1934 Rosenblatt
2,753,440 A 7/1956 Wakefield
(Continued)

FOREIGN PATENT DOCUMENTS

EP 0606146 7/1994

OTHER PUBLICATIONS

Pinta Acoustic Inc., pinta acoustic introduces SONEX® PLANO Absorbers Customizable to add a distinctive flair with high sound absorption, pp. 1-4, Oct. 27, 2015, Pinta Acoustic Inc., https://www.pinta-acoustic.com/blog/2015/10/27/sonex-plano-absorbers/.
(Continued)

*Primary Examiner* — Jeremy A Luks
(74) *Attorney, Agent, or Firm* — Patrick Sheldrake

(57) ABSTRACT

A dynamic acoustic locking ceiling baffle and a dynamic acoustic locking ceiling system, that includes a single piece of material folded into acoustic locking ceiling baffles, using locking pieces and locking mechanisms, to quickly and easily install the acoustic locking ceiling baffle onto con-
(Continued)

struction ceiling hangers to provide an aesthetically pleasing image, along with a reduction in unwanted noise or room acoustics.

18 Claims, 16 Drawing Sheets

Related U.S. Application Data

62/517,640, filed on Jun. 9, 2017, provisional application No. 62/518,347, filed on Jun. 12, 2017.

(51) Int. Cl.
*E04B 1/82* (2006.01)
*E04B 9/36* (2006.01)

(56) References Cited

U.S. PATENT DOCUMENTS

| | | | |
|---|---|---|---|
| 3,312,304 | A | 4/1967 | Chen |
| 3,378,974 | A | 4/1968 | Bush |
| 3,473,280 | A | 10/1969 | Stahlhut |
| 3,522,923 | A | 8/1970 | Charpentier |
| 3,578,105 | A | 5/1971 | Griff |
| 3,765,141 | A | 10/1973 | Shayman |
| 3,969,870 | A | 7/1976 | Deaton |
| 3,996,458 | A | 12/1976 | Jones et al. |
| 4,197,923 | A | 4/1980 | Harris |
| 4,200,171 | A | 4/1980 | Seymour et al. |
| 4,228,867 | A | 10/1980 | Wirt |
| 4,365,449 | A | 12/1982 | Liautaud |
| 4,665,674 | A | 5/1987 | Brugman |
| 5,128,850 | A | 7/1992 | Juodvalkis |
| 5,292,282 | A | 3/1994 | Callas |
| 5,832,685 | A | 11/1998 | Hermanson |
| 6,209,680 | B1 | 4/2001 | Perdue |
| 6,374,564 | B1 | 4/2002 | Fletterick |
| D658,786 | S | 5/2012 | Koennecke |
| 8,733,053 | B2 | 5/2014 | Kabatsi et al. |
| 8,782,987 | B2 | 7/2014 | Kabatsi et al. |
| 9,038,344 | B2 | 5/2015 | Mayer |
| 9,163,402 | B2 | 10/2015 | Kabatsi et al. |
| 9,175,473 | B2 | 11/2015 | Kaump |
| RE45,851 | E | 1/2016 | Bodine |
| 9,279,253 | B1 | 3/2016 | Gaydos |
| 9,353,521 | B2 | 5/2016 | Waters |
| 9,410,317 | B1 | 8/2016 | Kilian et al. |
| D767,171 | S | 9/2016 | Kilian et al. |
| D767,816 | S | 9/2016 | Kilian et al. |
| D771,279 | S | 11/2016 | Kilian et al. |
| D771,280 | S | 11/2016 | Kilian et al. |
| D771,281 | S | 11/2016 | Kilian et al. |
| 9,506,249 | B2 | 11/2016 | Kabatsi et al. |
| D777,349 | S | 1/2017 | Kilian et al. |
| D777,943 | S | 1/2017 | Kilian et al. |
| D777,944 | S | 1/2017 | Kilian et al. |
| D777,945 | S | 1/2017 | Kilian et al. |
| D777,946 | S | 1/2017 | Kilian et al. |
| D777,951 | S | 1/2017 | Kilian et al. |
| D781,464 | S | 3/2017 | Kilian et al. |
| D783,182 | S | 4/2017 | Kilian et al. |
| D783,183 | S | 4/2017 | Kilian et al. |
| D783,184 | S | 4/2017 | Kilian et al. |
| D784,562 | S | 4/2017 | Kilian et al. |
| D784,563 | S | 4/2017 | Kilian et al. |
| D784,564 | S | 4/2017 | Kilian et al. |
| D784,565 | S | 4/2017 | Kilian et al. |
| D785,212 | S | 4/2017 | Kilian et al. |
| 9,663,949 | B1 | 5/2017 | Caste |
| D791,979 | S | 7/2017 | Kilian et al. |
| D791,980 | S | 7/2017 | Kilian et al. |
| D791,981 | S | 7/2017 | Kilian et al. |
| D792,986 | S | 7/2017 | Kilian et al. |
| D794,222 | S | 8/2017 | Kilian et al. |
| D794,223 | S | 8/2017 | Kilian et al. |
| D794,224 | S | 8/2017 | Kilian et al. |
| D794,836 | S | 8/2017 | Kilian et al. |
| D795,466 | S | 8/2017 | Kilian et al. |
| 9,739,057 | B2 | 8/2017 | Bergman |
| 9,765,519 | B2 | 9/2017 | Bergman |
| D802,173 | S | 11/2017 | Kilian et al. |
| D802,174 | S | 11/2017 | Kilian et al. |
| D821,613 | S | 6/2018 | Kilian et al. |
| 10,094,108 | B2 | 10/2018 | Murao |
| D840,551 | S | 2/2019 | Kilian et al. |
| D846,160 | S | 4/2019 | Kilian et al. |
| 10,584,488 | B2 | 3/2020 | Gillette |
| 11,603,661 | B2 * | 3/2023 | Gillette |
| 2003/0019179 | A1 | 1/2003 | Colson |
| 2003/0205016 | A1 | 11/2003 | Gulbrandsen |
| 2006/0248826 | A1 | 11/2006 | Owens |
| 2011/0078970 | A1 | 4/2011 | Boyd |
| 2012/0317915 | A1 | 12/2012 | Koennecke |
| 2015/0068135 | A1 | 3/2015 | Waters |
| 2016/0281353 | A1 | 9/2016 | Gillette |
| 2017/0073968 | A1 | 3/2017 | Kilian |
| 2018/0245344 | A1 | 8/2018 | Venjen-Jensen |
| 2018/0363295 | A1 | 12/2018 | Gillette |

OTHER PUBLICATIONS

ECHOJAZZ AG, EchoBaffle, single Facebook® post, single album, and two images from album, Jun. 26, 2015, Facebook®, https://www.facebook.com/echojazz.acoustic/.

ECHOJAZZ AG, EchoPanel® FOLD-IT MAXI by Gavin Harris, single Facebook® post, single album, and three mages from album, Jun. 26, 2015, Facebook®, https://www.facebook.com/echojazz.acoustic/.

(Author Uknown), Marketing Bulletin Tectum Sound Baffle Application, Mar. 2006, pp. 1-2, https://www.buildsite.com/pdf/tectum/Hanging-Baffles-Installation-Instructions-B4616.pdf.

* cited by examiner

Acoustic Testing (ASTM C 423)

| FREQUENCY (Hz) | SOUND ABSORPTION COEFFICIENT |
|---|---|
| 32 | .03 |
| 40 | .01 |
| 50 | -.02 |
| 63 | -.07 |
| 80 | .06 |
| 100 | .09 |
| 125 | .12 |
| 160 | .20 |
| 200 | .24 |
| 250 | .33 |
| 315 | .45 |
| 400 | .59 |
| 500 | .76 |
| 630 | .85 |
| 800 | .89 |
| 1,000 | 1.00 |
| 1,250 | 1.06 |
| 1,600 | 1.06 |
| 2,000 | .99 |
| 2,500 | .89 |
| 3,150 | .83 |
| 4,000 | .94 |
| 5,000 | 1.04 |
| 6,300 | 1.00 |
| 8,000 | 1.05 |
| 10,000 | 1.07 |
| 12,500 | 1.07 |

72

74

Fig. 13

APPARATUS AND SYSTEM FOR DYNAMIC ACOUSTIC LOCKING CEILING SYSTEM AND METHODS THEREOF

The present application claims priority to U.S. patent application Ser. No. 16/792,573, filed Feb. 17, 2020, allowed on Dec. 6, 2022, which claims priority to U.S. patent application Ser. No. 15/639,572, filed Jun. 30, 2017, allowed on Nov. 20, 2019, which claims priority to U.S. Provisional Patent Application Ser. No. 62/357,066, filed Jun. 30, 2016, entitled "Apparatus And System For Dynamic Acoustic Locking Ceiling System And Methods Thereof", U.S. Provisional Patent Application Ser. No. 62/357,026, filed Jun. 30, 2016, and entitled "Apparatus And System For Dynamic Acoustic Ceiling System And Methods Thereof", U.S. Provisional Patent Application Ser. No. 62/517,640, filed Jun. 9, 2017, and entitled "Ceiling Baffle Apparatus And Ceiling Baffle System For A Dynamic Acoustic Ceiling And Methods Thereof", and U.S. Provisional Patent Application Ser. No. 62/518,347, filed Jun. 12, 2017, entitled "Apparatus And System For Dynamic Acoustic Locking Ceiling System And Methods Thereof", all of which are hereby incorporated by reference in their entirety.

BACKGROUND a. Technical Field

The instant disclosure relates to locking ceiling baffles, a system for dynamic acoustic locking ceiling baffles, along with the methods for installing the locking ceiling baffles, and in particular, the instant disclosure relates to a dynamic acoustic ceiling system that utilizes a locking mechanism for configuring each baffle that can be quickly and easily installed into construction ceiling hangers, to provide an aesthetically pleasing image, along with a reduction in unwanted noise and/or room acoustics.

The instant disclosure further relates to an apparatus that is configured using recycled polyester felt or PET Felt, and in an embodiment, is made up of a two-dimensional configuration that can be bended and/or folded into a baffle shape, which uses a locking instrument to retain the baffle shape. Each baffle is configured from a PET Felt sheet with pre-formed folding scores and cutouts that will either receive the locking instruments once the baffle has been created, or provide a locking mechanism or configurations, made of the same PET Felt material, for installing the baffle into a ceiling hanger without any extra tools, clips or attachment devices.

b. Background of Disclosure

In general terms, ceilings can be of two different types, suspended or exposed. Suspended ceilings are usually hung at a distance below the structural members to hide mechanical and electrical equipment, along with electrical conduit, HVAC ducts, water pipes, sewage lines, lighting fixtures, and similar structures. In order to construct a suspended ceiling, a metal grid is suspended from the actual ceiling, usually by wires, and acoustical or similar tiles, are inserted and supported by the grid.

However, either for cost or design purposes, many designs provide that the mechanical and electrical equipment are to be seen and not hidden. In these designs, there is no dropped ceiling and the ceiling is left to be viewed from the floor. Although the exposed ceiling may be a function of the design appeal, quite often an exposed ceiling creates acoustic problems, especially in large industrial rooms. Sound from one area of the room, can be reflected off the ceiling and be heard in other areas of the room. If there are a lot of workers or machinery, the room can become quite loud.

In order to minimize excessive and/or unwanted sound generated because of the exposed ceiling, one solution is to hang baffles from the ceiling at certain intervals to allow for the exposed ceiling to be viewed, but to reduce the acoustic profile. As an example of a structure intended to reduce unwanted noise is the Supported Architectural Structure disclosed and claimed in U.S. Pat. No. 8,782,987, to Kabatsi et al., which discloses a plurality of primary supports configured to couple with one or more architectural structures, and a plurality of flexible fins is incorporated into the structure using primary supports, secondary supports and attachment points.

Another example of a ceiling structure is U.S. patent application Ser. No. 10/774,233, to Stackenwalt et al., which discloses a decorative structure, which may be curved, suspended within a space and which includes a panel fastened to a support structure by a clip, a portion of which extends along a face of the panel.

These examples utilize additional supports, attachment hardware and clips to assist in suspending the flexible fins or decorative panels to the ceiling or to ceiling structure. In doing so, each of these examples necessitate tools to assemble the structure and to suspend the structure to the ceiling or ceiling support structure.

As such there is a need for a dynamic acoustic ceiling system that includes baffles, that look solid, but are hollow, and that can be quickly and easily assembled and installed onto existing construction ceiling hangers or support structures without the need for tools, separate attachment devices, clips or the like. There is also a need for a dynamic acoustic ceiling system that is an aesthetically pleasing image, and that reduces unwanted noise or room acoustics.

The foregoing is intended only to illustrate the present technical field and background art and should not be taken as a limitation or disavowal of claim scope.

BRIEF SUMMARY

The present disclosure is an improved acoustic locking ceiling baffle, and an improved dynamic acoustic locking ceiling system, along with improved methods for installing the locking ceiling baffles and creating the dynamic acoustic locking ceiling system. The improvement comprises a single piece of material, pre-scored and configured with an integral locking mechanism, to be folded into a shape that can provide an air gap, such as a rectangular, wedge or triangular shape. The locking mechanism can be cut out of the single piece of material or can be a magnet embedded in the single piece of material, among other locking mechanisms. The ceiling baffle is held in its folded configuration using a locking piece, which can also be integral with the single piece of material (but not necessarily) and is different from the locking mechanism. The locking piece can be made from a similar material such as felt, or by using magnets to hold the ceiling baffle together. The ceiling baffle can then be quickly and easily installed onto or into ceiling hangers or ceiling structures, such as a standard UNISTRUT® metal framing system, to provide an aesthetically pleasing image, along with functioning to reduce unwanted noise or room acoustics.

The present disclosure comprises a baffle that is manufactured from a recyclable and/or recycled material, such as recycled polyester felt or PET Felt, and in an embodiment, provides that each baffle is configured from a single piece of the PET Felt and folded into a rectangular shape or into a slab baffle with one or more locking pieces (or magnets) holding the rectangular shape in place. In this embodiment, the piece PET Felt is configured to be folded such that the locking mechanism (again, different from the locking piece) can be exposed and used to install the slab baffle into the ceiling hangers. The slab baffle is configured to look like it is a solid piece of PET Felt, but instead the slab baffle has an air gap created when the ceiling baffle shape was formed. Once formed, the top end of the ceiling baffle (the part to be connected to the hanger) comprises one or more locking configurations or mechanisms made of the same PET Felt material. This locking mechanism allows for the ceiling baffle to be locked into the ceiling hanger without the need for tools, clips or any additional attachment devices (besides the locking mechanism).

The present disclosure further relates to an improved dynamic acoustic locking ceiling system comprising a number of shaped locking ceiling baffles, such as rectangular, triangular or wedge shaped, that can be installed into a ceiling structure such that the system, as a whole, provides an aesthetically pleasing image.

The present disclosure further relates to an improved method of installing the locking ceiling baffles and creating the dynamic acoustic locking ceiling system, in which the acoustic locking ceiling baffles are installed into the ceiling structure by pushing the locking mechanism into the existing ceiling hanger, such as the standard UNISTRUT® metal framing system, without the need for additional tools, clips or additional attachment devices, to provide an aesthetically pleasing image, and to function to reduce unwanted noise or room acoustics.

The present disclosure also relates to an improved method of installing the locking ceiling baffles and creating the dynamic acoustic locking ceiling system, in which the acoustic locking ceiling baffles are snapped or attached to the ceiling structure through the use of magnets and magnetic attraction, such that magnets strategically embedded in the ceiling baffle in a location that once constructed, the ceiling baffle can be affixed to the existing ceiling hanger, such as the standard UNISTRUT® metal framing system, using the magnets and without the need for additional tools, clips or additional attachment devices, to provide an aesthetically pleasing image, and to function to reduce unwanted noise or room acoustics.

It is thus an objective of the present disclosure to provide an improved acoustic locking ceiling baffle, comprising a single piece of folded material and a plurality of locking pieces, along with a configuration in the folded material that creates a locking mechanism made of the same material as the baffle, and which allows for the baffle to be installed into an existing ceiling hanger without the need for tools, clips or additional attachment devices.

It is yet another objective of the present disclosure to provide an improved acoustic locking ceiling baffle, comprising a single piece of folded material and a plurality of embedded magnets to hold the ceiling baffle together, along with additional magnets located to create a locking mechanism made of the embedded magnets, and which allow for the baffle to be installed onto an existing ceiling hanger without the need for tools, clips or additional attachment devices.

It is yet another object of the present disclosure to provide an improved dynamic acoustic locking ceiling system in which the improved locking ceiling baffles are installed in a manner and pattern that creates an aesthetically pleasing image and functions to reduce unwanted noise or room acoustics.

It is yet another objective of the present disclosure to provide an improved method for installing the improved locking ceiling baffles and thereby creating the dynamic acoustic locking ceiling system with an aesthetically pleasing image and which functions to reduce unwanted noise or room acoustics.

Additional objectives and advantages of the present disclosure will become apparent to one having ordinary skill in the art after reading the specification in light of the drawing figures, however, the spirit and scope of the present invention should not be limited to the description of the embodiments contained herein.

BRIEF DESCRIPTION OF THE DRAWINGS

FIG. 13 is a chart of the acoustic testing in accordance with ASTM C 423 of the ceiling baffles in accordance with the present disclosure.

DETAILED DESCRIPTION

As stated herein, the objective of the present disclosure is to provide an improved acoustic locking ceiling baffle, and an improved dynamic acoustic locking ceiling system, along with improved methods for installing the locking ceiling baffles and creating the dynamic acoustic locking ceiling system.

Figure 1:
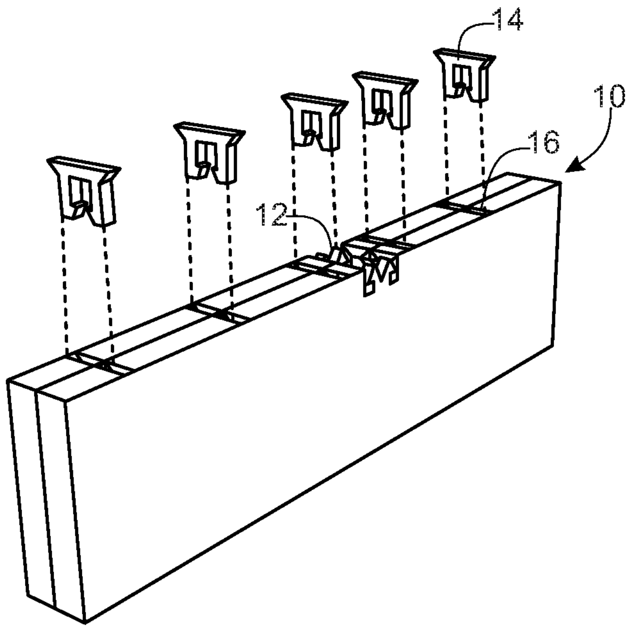
FIG. 1 is a perspective view of a portion of a locking ceiling baffle with the locking pieces removed in accordance with the present disclosure.

Referring to the drawings, wherein like reference numerals refer to the same or similar features in the various views, FIGS. 1 through 6 show different views of the improved locking baffle 10. FIG. 1 shows the resulting baffle 10 after being folded into shape, resulting in a locking mechanism 12 at the top of the ceiling baffle 10. The ceiling baffle 10, which is made in the preferred embodiment, from a single sheet of 9 mm polyester felt or PET Felt, and is intended to be folded into a rectangular or a slab shape, approximately 88 inches long, 8.68 inches high and 2.125 inches thick. One example for holding the slab baffle 10 in its shape includes the use of one or more locking pieces 14.

Figure 2A:
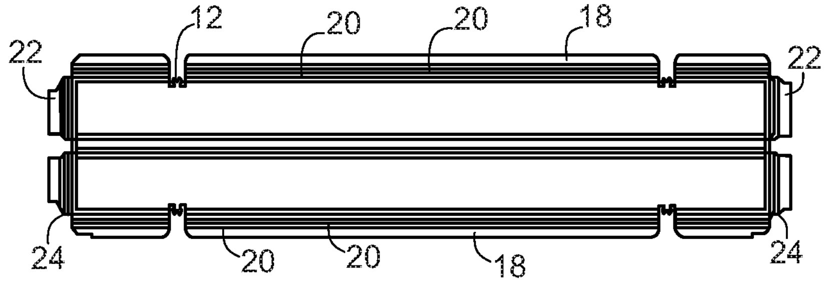
FIG. 2A is a perspective view of a locking ceiling baffle prior to folding into a baffle shape in accordance with the present disclosure.

FIG. 2A shows the ceiling baffle 10 prior to being constructed into its resulting shape. The unfolded or flat ceiling baffle 10 is made from a single piece of material, pre-scored for easy folding, and has various cutouts for the shape of the baffle 10 and for other functions, such as the locking mechanism as described below.

Figure 2B:
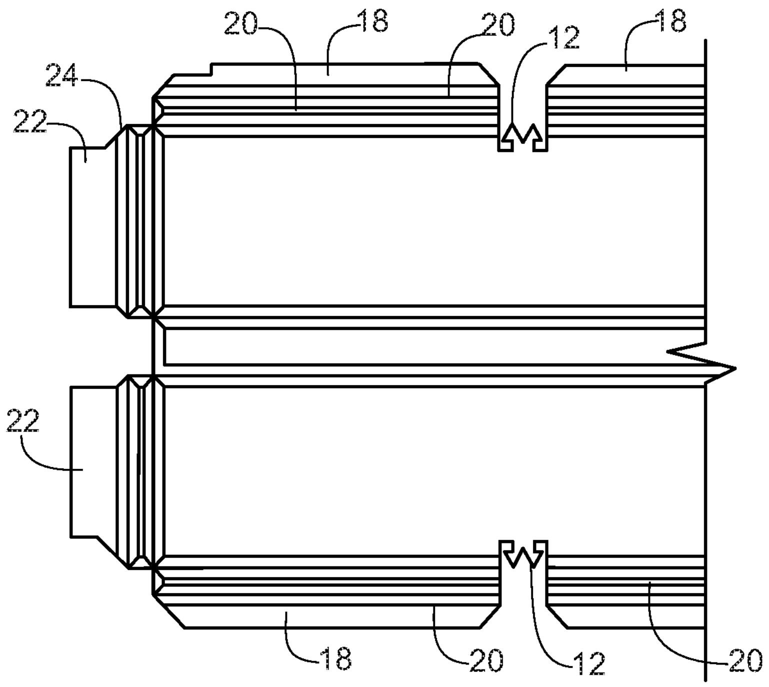
FIG. 2B is an enlarged view of FIG. 2A, one end of a locking ceiling baffle prior to folding into a baffle shape in accordance with the present disclosure.

As disclosed below, there are numerous ceiling baffle shapes and designs that can be constructed in accordance with the present disclosure. The portions of the ceiling baffle 10 that will make up the locking mechanism 12 are located such that when the sides 18 are folded at the side score lines 20, the locking mechanism 12 will be accessible for locking the ceiling baffle 10 onto the ceiling as disclosed below. Further, the ends 22 are also folded at the end score lines 24 during assembly of the ceiling baffle 10. This configuration allows the ceiling baffle 10 to be transported flat (FIG. 2A) and easily built or assembled at the installation site. FIG. 2B shows an enlarged end of the ceiling baffle 10 prior to assembly.

Figure 3:
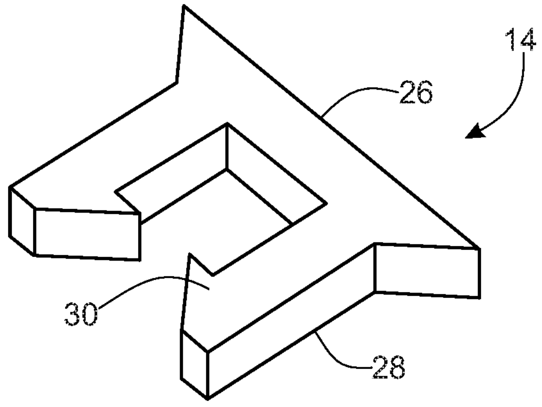
FIG. 3 is a perspective view of a locking piece for holding a folded slab baffle in its rectangular shape in accordance with the present disclosure.

FIG. 3 show an enlarged drawing of the locking piece 14, different than the locking mechanism 12, which is one example used to hold the ceiling baffle 10 together. The locking piece 14 in the preferred embodiment is also made of PET Felt and is sized and shaped to be inserted into the slab baffle at one or more insert locations 16, once folded to hold the slab baffle in its rectangular shape. The locking piece or pieces 14 can be inserted into the top of the slab baffle 10 at the insert locations 16 as shown in FIG. 1. In the preferred embodiment, the locking piece 14 is 2⅛ inches at the top 26 and tapers down to sides 28 of 1⁷⁄₁₆ inches. The locking piece 14 is also 1⁷⁄₁₆ high and has an arrow shaped edge 30 to assist in holding the ceiling baffle 10 together while resisting removal form the insert locations 16.

Figure 4:
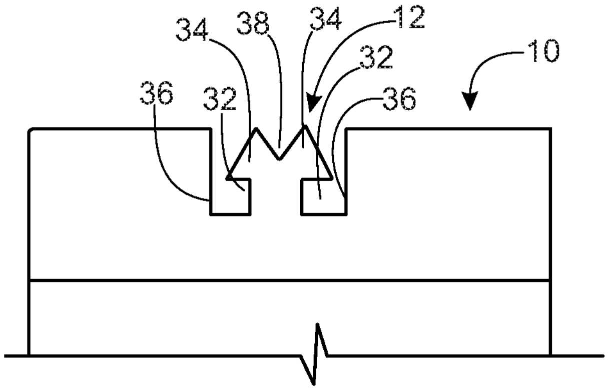
FIG. 4 is a front view of locking mechanism of a ceiling baffle in accordance with the present disclosure.

The resulting shape of the locking mechanism 12 on the ceiling baffle 10 is shown in detail in FIG. 4, and is created by cutting away portions 32 of the ceiling baffle 10 (see FIGS. 1 and 6 through 11 for exemplary locations of the locking mechanism 12 on the ceiling baffle 10). The locking mechanism is sized to fit into the recessed portion 42 of a ceiling hanger 40, such as a standard UNISTRUT® metal framing system (shown in FIG. 5), without the need for additional tools, clips or additional attachment devices.

The locking mechanism 12 is design is a double arrow 34, with recesses 36 below the double arrow 34 and an arrow recess 38 between the double arrows 34. The locking mechanism 12 is particularly designed or configured to mate with a ceiling hanger, as described below. However, other locking mechanisms 12 can be designed and configured (using the ceiling baffle material or other material) to mate with the same ceiling hanger described herein, or to mate with other ceiling hangers, without departing from the spirit and scope of the invention. For example, magnets embedded into the ceiling baffle 10 can be used to attach the ceiling baffle 10 to any metal ceiling structure.

The locking mechanism 12 is created by cutting away the PET Felt to leave the double arrow shape 34 with the cutaway portion 38 between the double arrows 34 to allow for ease of insertion into the ceiling hanger in accordance with the present disclosure. Due to the location of the locking mechanism 12 on the ceiling baffle 10, the locking mechanism 12 is also 9 mm thick, but there are two locking mechanisms 12 for each location, and they are sized to fit into the recessed portion of a standard ceiling hanger, such as a standard UNISTRUT® metal framing system, without the need for additional tools, clips or additional attachment devices. One or more locking mechanisms 12 can be designed into each ceiling baffle 10 depending on the length and need of the ceiling baffle 10.

Figure 5:
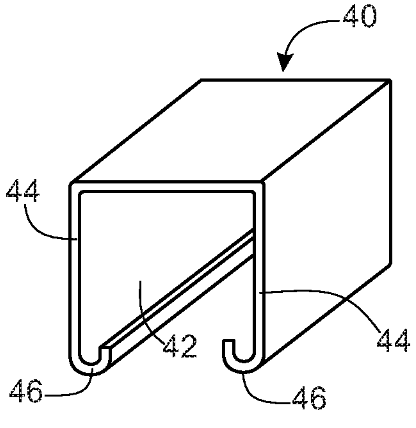
FIG. 5 is a perspective view of a prior art standard ceiling hanger in accordance with the present disclosure.

FIG. 5 shows a standard UNISTRUT® metal framing system, including the recessed portion 42, the sides 44 of the ceiling hanger 40, and the J-shaped ends 46. To install the locking mechanism 12 of the ceiling baffle 10 into the UNISTRUT ceiling hanger 40, the ceiling baffle 10 is located such that the double arrows 34 can be slid into the recessed portion 42 of the ceiling hanger 40 to be held in place by the sides 44 of the ceiling hanger 40 and the J-shaped ends 46 on the sides 44. Additionally, the ceiling baffle 10 can be placed in the proper location and pushed or snapped into place such that the double arrows 34 compress towards the arrow recess 38 and/or toward the recesses 36 below the double arrows 34 to fit past the J-shaped ends 46 on the sides 44 of the ceiling hanger 40. Once past the J-shaped ends 46, the double arrows 34 spring back or expand back to their normal position inside ceiling hanger 40.

Different sized and shaped locking pieces 14 (for holding the ceiling baffle 10 in its folded position) and locking mechanisms 12 (for installing the folded ceiling baffle 10 into the ceiling hangers 40) can be created depending on need, based on the size and shape of the ceiling baffle 10 and the ceiling hangers 40, or on any other device for which the ceiling baffle 10 will be attached. Further, FIG. 1 shows five locking pieces 14 and one locking mechanisms 12 for the ceiling baffle 10, however, each baffle 10 can be configured with more or less locking pieces 14 or locking mechanisms 12 depending on the need, and based on the configuration of the ceiling baffle 10 and the location and number of the ceiling hangers 40 on the ceiling.

Figure 6:
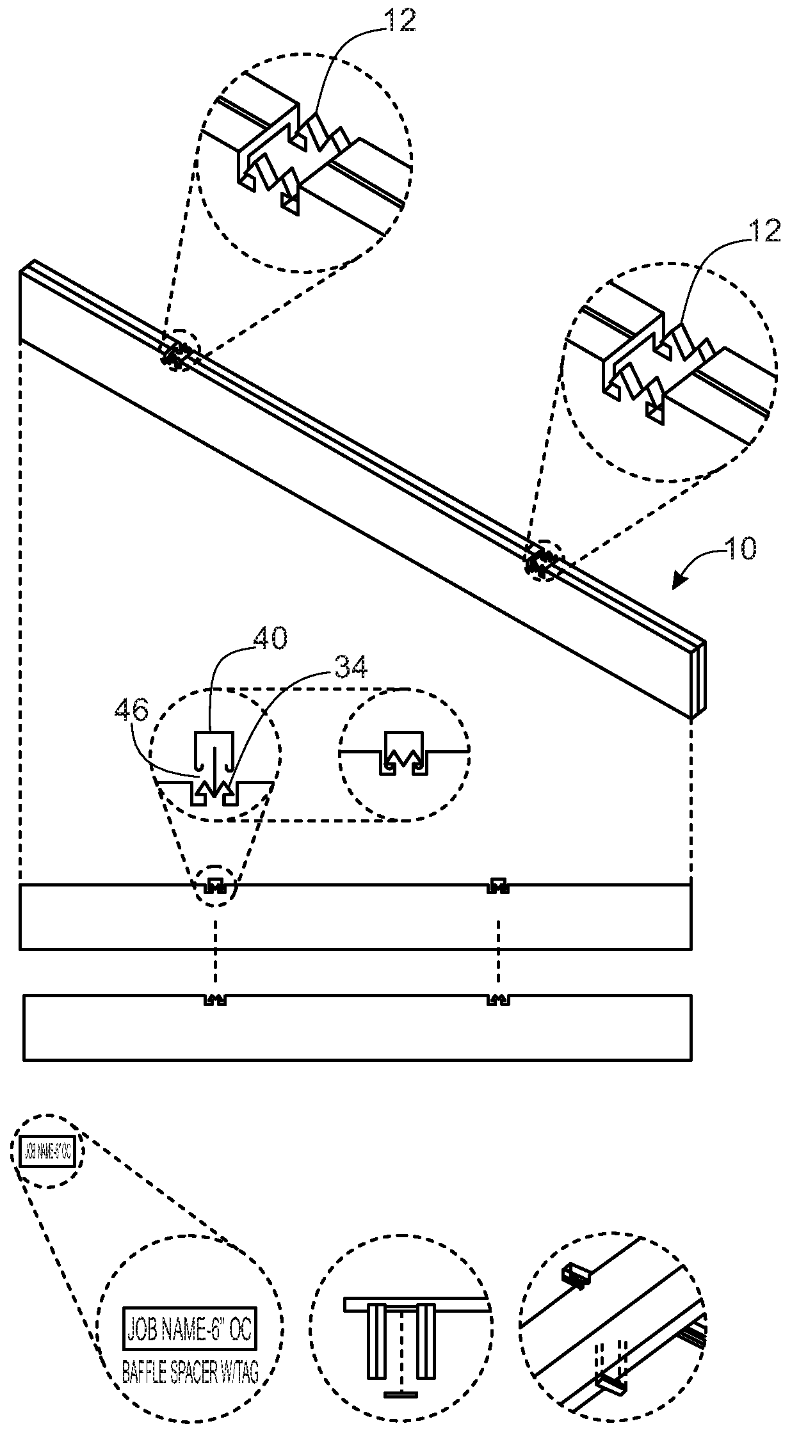
FIG. 6 is a perspective view of a locking ceiling baffle with a locking mechanism prior to and after insertion into a standard ceiling hanger in accordance with the present disclosure.

FIG. 6 shows the improved locking mechanism 12 of the ceiling baffle 10 prior to and after being inserted into the UNISTRUT hanger 40 in which the locking mechanism 12 can be seen up and inside the hanger 40 with the two ends of the double arrow 34 locked in the inside of the J-shaped ends 46 of the hanger 40, from FIG. 5.

Figure 7:
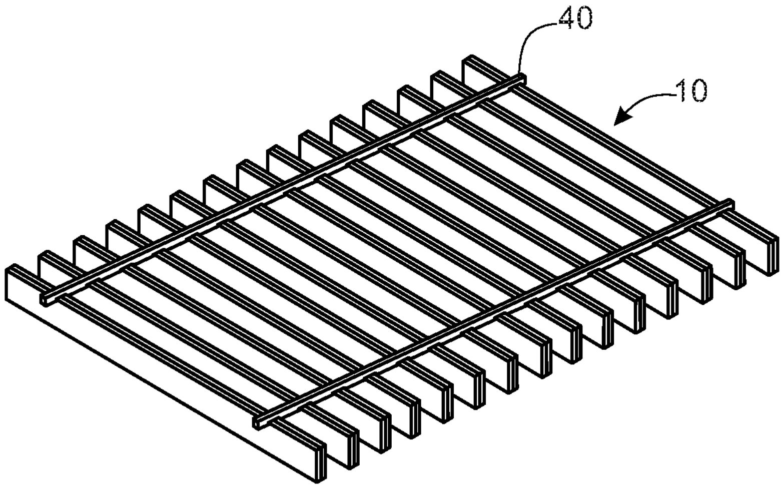
FIG. 7 is a top perspective view of locking slab baffles installed in accordance with the present disclosure.
Figure 8:
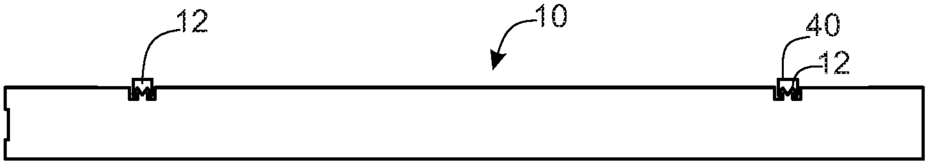
FIG. 8 is a front elevation view of a locking ceiling baffle after being folded into a locking slab baffle shape in accordance with the present disclosure.
Figure 9:
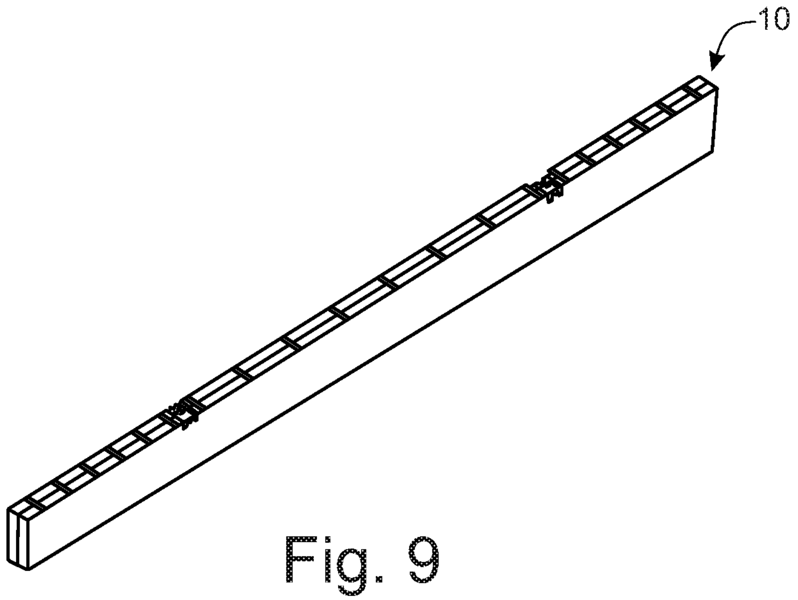
FIG. 9 is a top perspective view of a locking ceiling baffle after being folded into a locking slab baffle shape indicating the locking pieces in accordance with the present disclosure.
Figure 10:
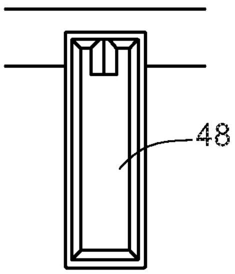
FIG. 10 is a side elevation view of a locking ceiling baffle after being folded into a locking slab baffle shape in accordance with the present disclosure.

FIG. 7 shows a perspective views of multiple locking ceiling baffles 10 installed in accordance with the present disclosure. FIGS. 8 through 10 show different views of the locking ceiling baffle 10, including the front elevation (FIG. 8), top perspective detail (FIG. 9) and the air gap 48 (FIG. 10), which increases the acoustic absorbency by approximately 50%. The assembled ceiling baffle 10, in the preferred embodiment, is 84 inches long, with two locking mechanisms 12 10.47 inches (on center) from the ends, and provides the look of a solid 2.125 inch block of material, but instead uses a 1.5 inch air gap 48 to reduce acoustics and weight.

A system may include more or less locking ceiling baffles 10 depending on the size of the room. Further, the present disclosure is not limited to the particular shaped baffles described herein, as other shaped locking ceiling baffles 10 can be created by folding the pre-scored piece of PET Felt used in the present disclosure with different dimensions to obtain similar results, as disclosed below.

Figure 11A:
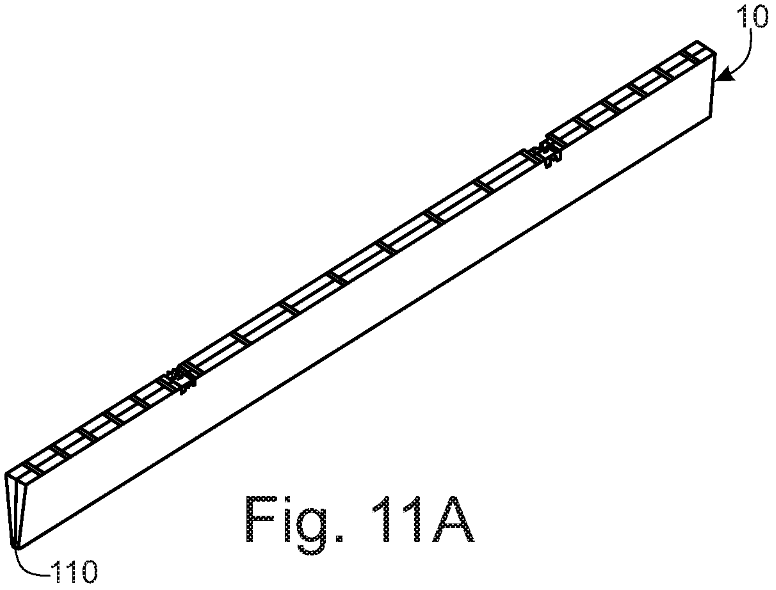
FIG. 11A is a perspective view of a ceiling baffle in accordance with the present disclosure.

Another embodiment, similar to the disclosure above, of ceiling baffles 10, is shown in FIGS. 11A through 11E, which show an alternative embodiment design ceiling baffle 10 in accordance with the present disclosure. FIG. 11A shows a perspective view of an assembled ceiling baffle 10, but instead of a rectangular shape as detailed above, the alternative embodiment forms a wedge 110 ceiling baffle 10 when assembled. At its widest point, the wedge ceiling baffle 10 is 2.125 inches wide, but the ceiling baffle 10 tapers to a wedge 110 at the other end of the ceiling baffle.

Figure 11B:
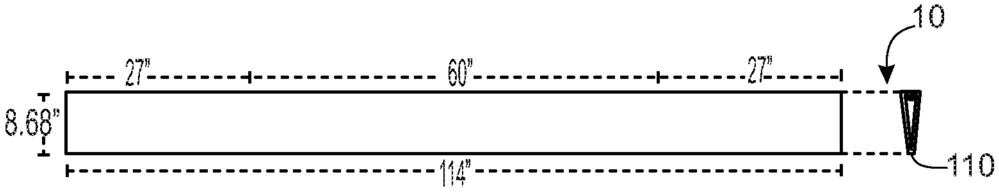
FIGS. 11B through 11E are front views of differently shaped ceiling baffles in accordance with the present disclosure.
Figure 11C:
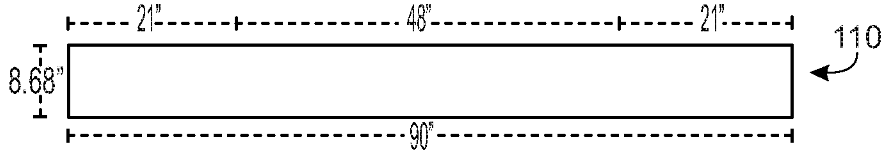
Figure 11D:
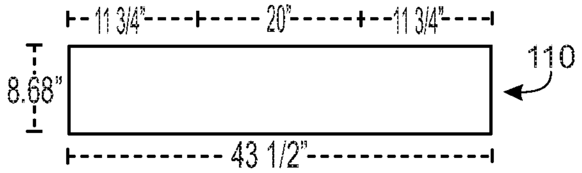
Figure 11E:
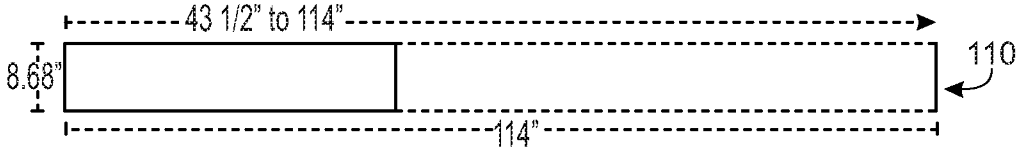

FIGS. 11B through 11E show that the wedge ceiling baffle 10 design can be manufactured in various sizes and shapes to be configured for different size and shaped ceilings, to create the wedge baffle image. These figures show different lengths for the various wedge ceiling baffles 10. FIG. 11B for example shows a large wedge ceiling baffle 10 that is 114 inches long and 8.68 inches deep, while FIG. 11C shows a medium wedge ceiling baffle 10 that is 90 inches long and 8.68 inches deep, and FIG. 11D shows a small wedge ceiling baffle 10 that is 43.5 inches long and 8.68 inches deep. Additionally, FIG. 11E shows a wedge ceiling baffle 10 that is a custom size from 43.5 inches long to 114 inches long and 8.68 inches deep. Of course, other size carved ceiling baffles 10 can be manufactured in keeping within the scope of the invention.

Figure 12A:
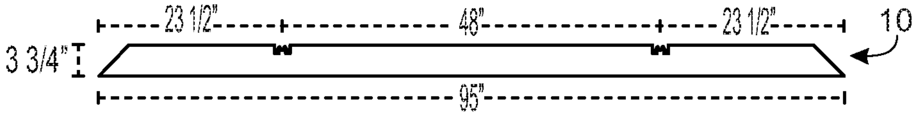
FIGS. 12A through 12D are front views of ceiling baffle in accordance with the present disclosure.
Figure 12B:
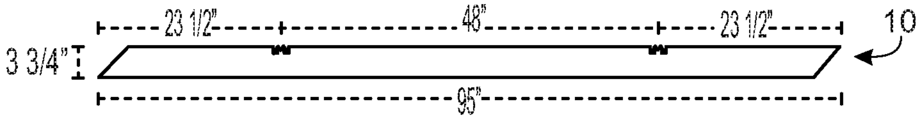
Figure 12C:
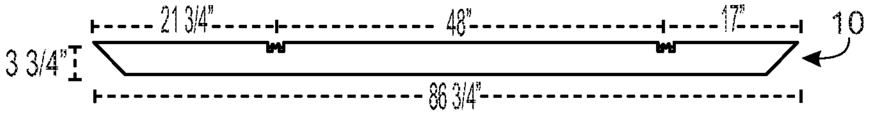
Figure 12D:
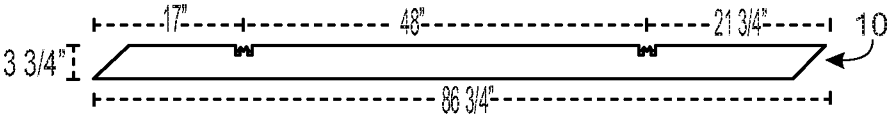
Figure 12E:
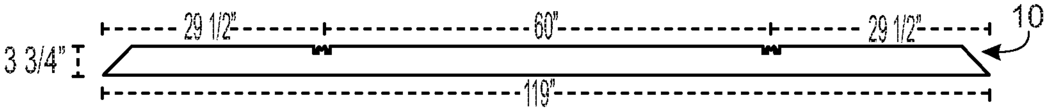
FIGS. 12E through 12N are front views of differently shaped ceiling baffles in accordance with the present disclosure.
Figure 12F:
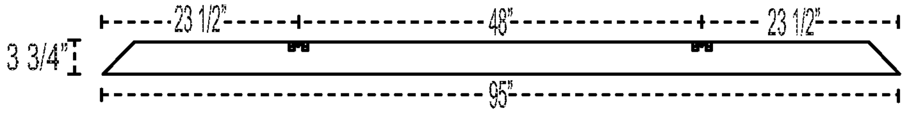
Figure 12G:
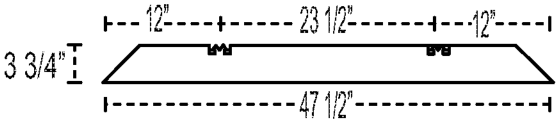
Figure 12H:
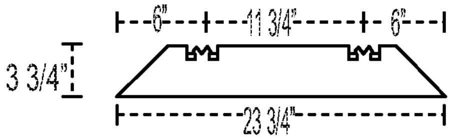
Figure 12I:
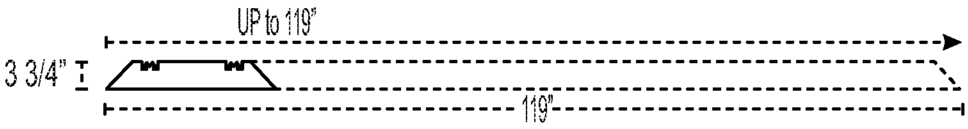
Figure 12J:
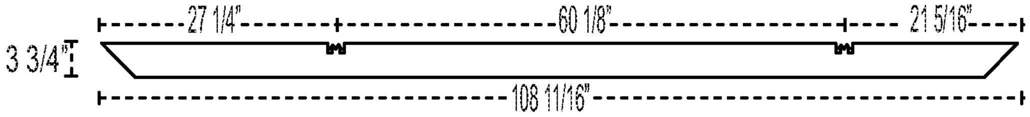
Figure 12K:
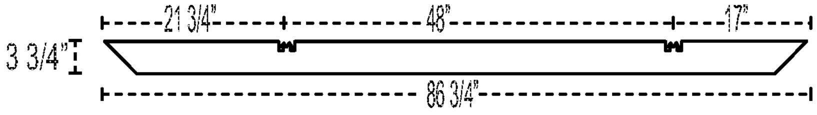
Figure 12L:
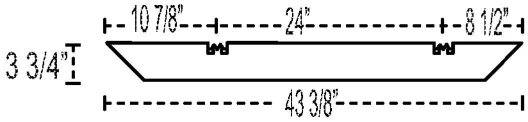
Figure 12M:
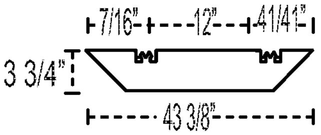
Figure 12N:
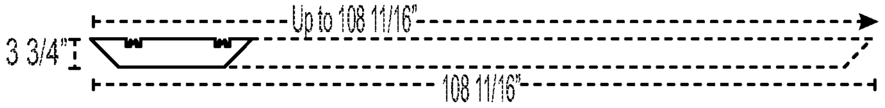

Yet another embodiment of ceiling baffles 10, similar to the disclosure above is shown in FIGS. 12A through 12N, which show an alternative embodiment design ceiling baffle 10 in accordance with the present disclosure. FIGS. 12A through 12D show perspective views of an assembled ceiling baffles 10, but instead of a rectangular shape as detailed above, the alternative embodiments form trapezoid (FIGS. 12A and 12C) or parallelogram (FIGS. 12B and 12D) shaped ceiling baffles 10 when assembled and viewed from a front elevation. However, each of these shapes are 3.75 inches deep (although other depths can be designed in accordance with the disclosure), and are assembled into a triangular profile ceiling baffle 10, when view from the sides. These ceiling baffles 10 provide an internal air gap of 6.44 inches and boast an NRC rating of 1.55.

FIGS. 12E through 12N show that the triangular ceiling baffle 10 design can be manufactured in various sizes and shapes to be configured for different size and shaped ceilings, to create the triangular baffle image. These figures show different lengths for the various wedge ceiling baffles 10, including the four different configurations shown in FIGS. 12A through 12D. FIGS. 12E and 12J for example show large triangular ceiling baffles 10 that are 119 inches and $108^{11}/_{16}$ inches long, respectively, while FIGS. 12F and 12K show medium triangular ceiling baffles 10 that are 95 inches and 86.75 inches long, respectively. FIGS. 12G and 12L show triangular ceiling baffles 10 that are 47.5 inches and $43^{3}/_{8}$ inches long, respectively and FIGS. 12H and 12M show small triangular ceiling baffles 10 that are 23.75 inches and 23.75 inches long, respectively. Additionally, FIGS. 12I and 12N show a triangular ceiling baffles 10 that are custom size from 23.75 inches long to 119 inches long and $108^{11}/_{16}$ inches long, respectively. Of course, other size triangular ceiling baffles 10 can be manufactured in keeping within the scope of the invention.

As described herein, the material used in the preferred embodiment is polyester felt and is 99% recycled. The ceiling baffles 10 in the preferred embodiment are 9 mm thick, and the panel thickness (after assembly) is 2.125 inches thick, with a standard size of 8.68 inches by 88 inches. The edge options are exposed felt, and maintenance includes occasional vacuuming to remove particulate matter and air-borne debris or dust. Compressed air can be used to dust off the material in difficult to reach areas and for large assemblies.

The felt comes in numerous colors, including white, cream, light grey, light brown, brown, matte grey, charcoal, black, yellow, mango, orange, red, lavender, lime, green, light blue and dark blue. Of course, the ceiling baffles 10 can be manufactured in many other colors and the present disclosure is not limited to these specifications and colors, as these are merely the specifications and colors for the preferred embodiments and alternative embodiments.

FIG. 13 shows a chart for the acoustic testing standard ASTM C423 for the ceiling baffles 10 in the preferred embodiment. The chart indicates testing on the preferred embodiment and provides the results of the sound absorption coefficient for the ceiling baffle 10 at various frequencies. The test arrangement used a +100 mm air layer filled with 50 mm rock wool board. As described herein, the noise reduction coefficient at 500 Hz 70 is 0.76 72, and at 1000 Hz 74 is 1.00 76. Further, the ceiling baffles 10 are fire rated as UL tested ASTM E-84: Class A.

Figure 14:
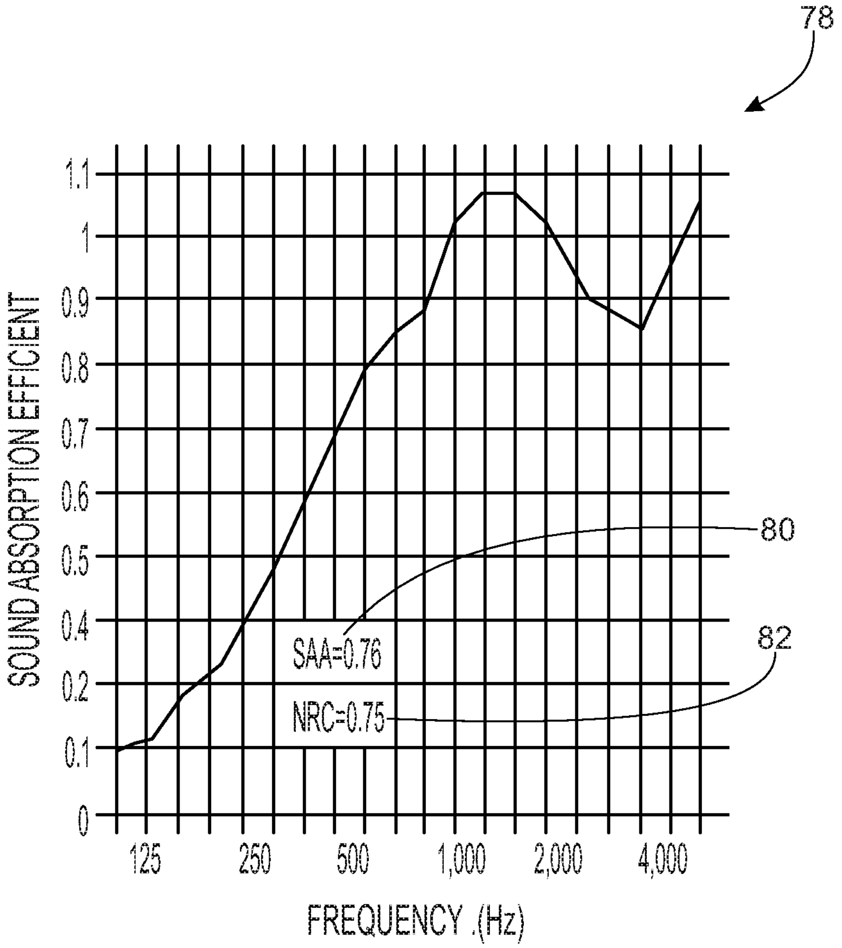
FIG. 14 is a graph of the acoustic testing in accordance with ASTM C 423 of the ceiling baffles in accordance with the present disclosure.

FIG. 14 shows the graph 78 of the sound absorption coefficient against frequency for the same test, with the sound absorption average (SAA) 80 of 0.76, and the noise reduction coefficient (NRC) 82 of 0.75.

Figure 15A:
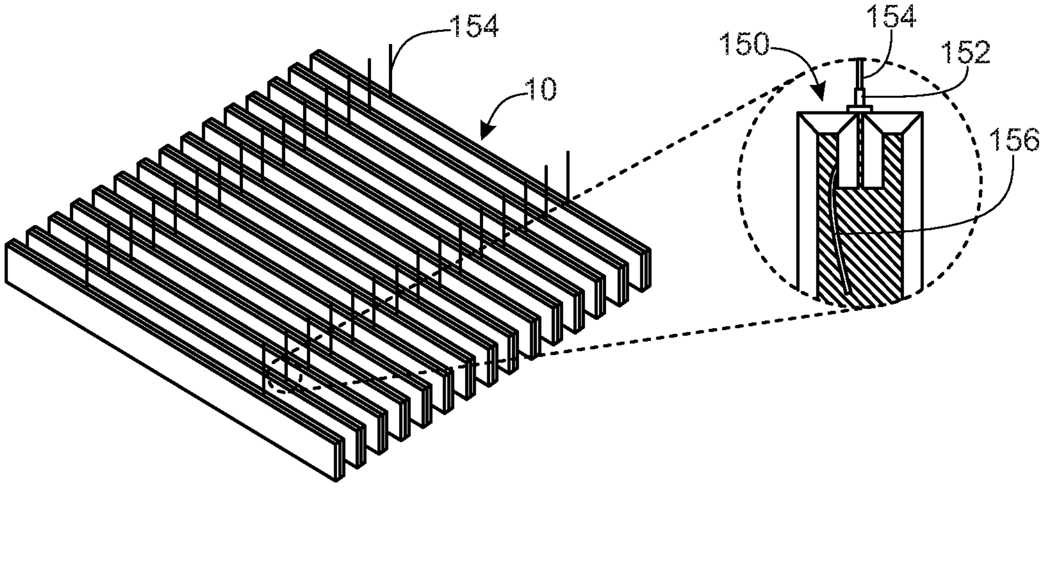
FIGS. 15A and 15B are perspective views of an attachment mechanism of a ceiling baffle in accordance with an alternative embodiment of the present disclosure.
Figure 15B:
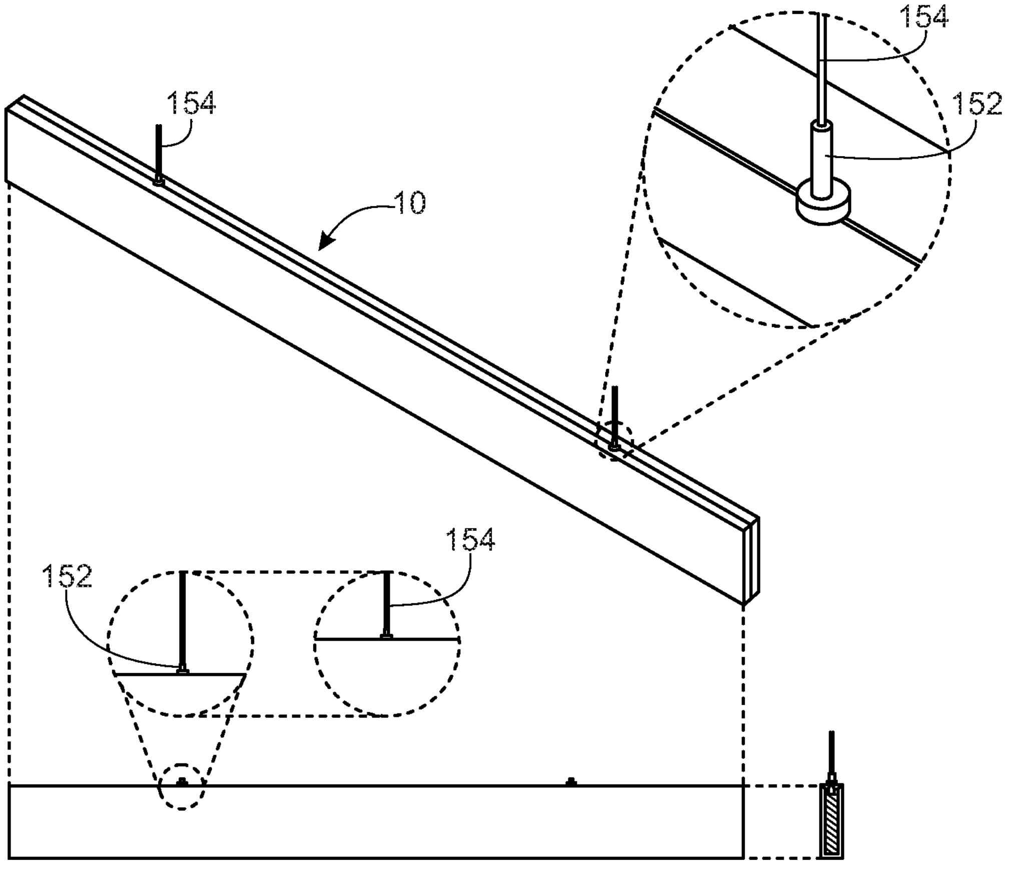

Alternative embodiments exist for attaching a slab baffle 10 to a ceiling. One alternative embodiment is shown in FIGS. 15A and 15B and utilizes a cable suspension system 150 in which the slab baffles 10 have an embedded cable gripper 152 such that the slab baffle 10 can be snapped into deck-mounted aircraft cables 154. The aircraft cables 154 can be arranged in any desired pattern or configuration and once installed, the excess cable 156 will protrude through the slab baffle 10 and can be cut off with a scissors or left alone.

Figure 16A:
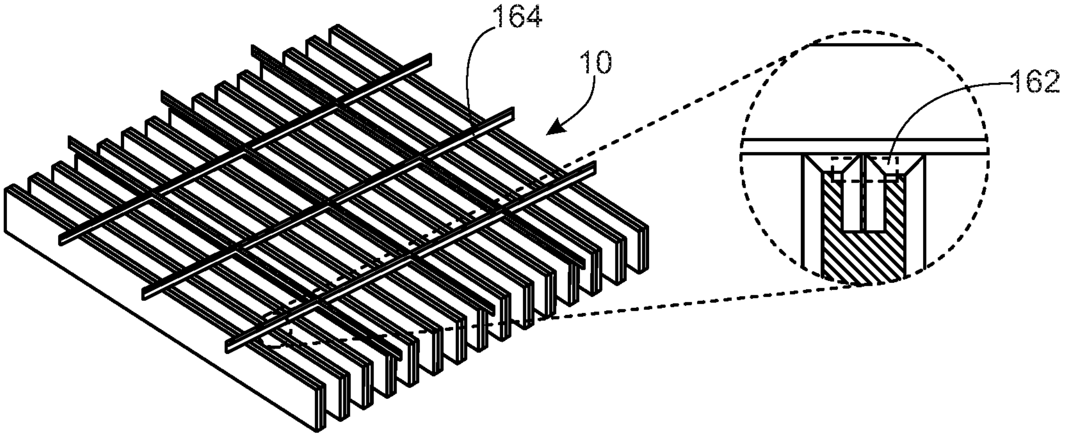
FIGS. 16A and 16B are perspective views of a locking mechanism of a ceiling baffle in accordance with an alternative embodiment of the present disclosure.
Figure 16B:
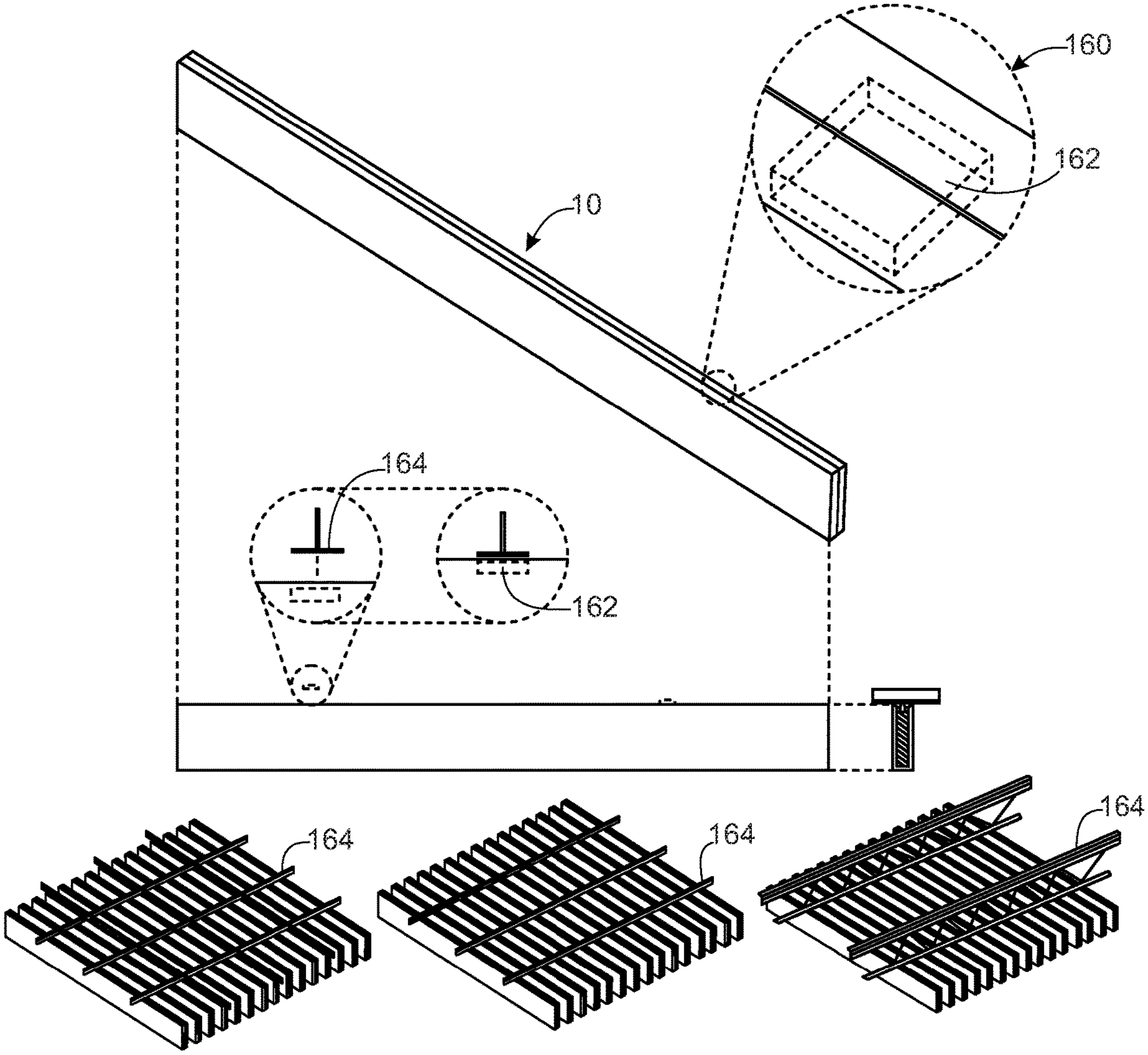

Another alternative embodiment for attaching a slab baffle 10 to a ceiling is shown in FIGS. 16A and 16B and utilizes a magnetic connection system 160. The slab baffles 10 are embedded with magnets 162 such that they will connect and hang onto any ceiling or ceiling structure 164 that is made from any ferrous metal material, such as a Unistrut, tee bar or steel joist, among others. The slab baffle 10 containing the magnet 162 can be snapped into place adjacent the ferrous metal structure in any desired pattern or configuration.

Figure 17:
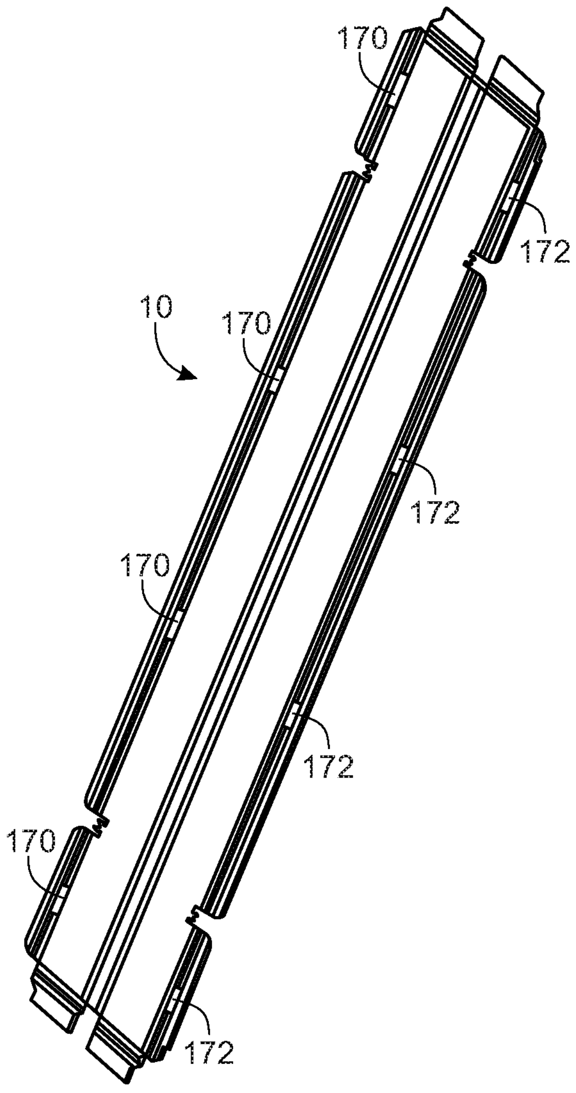
FIG. 17 is a perspective view of an alternative locking ceiling baffle prior to folding into a baffle shape in accordance with the present disclosure.

Additionally as disclosed above, an alternative embodiment for assembling the ceiling baffle 10 of the present disclosure includes using magnets embedded into the ceiling baffle 10 so that when the flat ceiling baffle 10 is folded and assembled into its final form, the embedded magnets will hold the ceiling baffle 10 in that form without the need for the locking pieces 14 disclosed herein. FIG. 17 shows the flat ceiling baffle 10 with one or more magnets 170 embedded into the baffle 10 on one side, and with one or more magnets 172 embedded into the baffle 10 on the other side, so that when the ceiling baffle 10 is assembled, the magnets 170 and the magnets 172 will come in close contact or actually make contact with each other, thereby holding the assembled ceiling baffle 10 together. These magnets 170, 172 are different than the magnets 162 used for the locking mechanism 12 disclosed herein and in FIGS. 16A and 16B. Although, in certain designs the same magnets can be used for both purposes.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment.

Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional. Although numerous embodiments of this invention have been described above with a certain degree of particularity, those skilled in the art could make numerous alterations to the disclosed embodiments without departing from the spirit or scope of this disclosure.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims. Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A ceiling baffle assembly comprising:

a single piece of material comprising score lines, the single piece of material being alterable from a flat state to a folded state by folding the single piece of material at the score lines, wherein in the folded state the single piece of material forms a ceiling baffle comprising a first outer sidewall, a second outer sidewall, a bottom wall extending between the first and second outer sidewalls, and a top wall extending between the first and second outer sidewalls, the top wall comprising one or more insert locations;

at least one locking piece comprising a top portion, a first side portion extending downwardly from the top portion, and a second side portion extending downwardly from the top portion in a spaced apart manner from the first side portion, wherein the at least one locking piece is non-integral with the single piece of material; and wherein the at least one locking piece is configured to be inserted into the top wall of the ceiling baffle at one of the one or more insert locations to hold the single piece of material together in the folded state, and wherein upon removal of the at least one locking piece the single piece of material is configured to be altered from the folded state back to the flat state.

2. The ceiling baffle assembly according to claim 1, wherein said single piece of material is formed from a felt material.

3. The ceiling baffle assembly according to claim 1, wherein said at least one locking piece is formed from a felt material.

4. The ceiling baffle assembly according to claim 1, wherein said ceiling baffle has a rectangular shape.

5. The ceiling baffle assembly according to claim 1, wherein said ceiling baffle has a wedge shape.

6. The ceiling baffle assembly according to claim 1, wherein said ceiling baffle has a triangular shape.

7. The ceiling baffle assembly according to claim 1 further comprising:

the ceiling baffle being elongated along a longitudinal axis from a first end of the ceiling baffle to a second end of the ceiling baffle;

the ceiling baffle comprising a first end wall located at the first end of the ceiling baffle and a second end wall located at the second end of the ceiling baffle; and wherein the single piece of material comprises the first and second end walls, and wherein the at least one locking piece is a separate part from each of the first and second end walls.

8. The ceiling baffle assembly according to claim 7 wherein the first and second outer sidewalls, the top wall, the bottom wall, and the first and second end walls of the ceiling baffle form a closed structure that defines a fully enclosed air gap.

9. The ceiling baffle assembly according to claim 1 wherein the ceiling baffle is elongated along a longitudinal axis from a first end of the ceiling baffle to a second end of the ceiling baffle, and wherein each of the one or more insert locations is located inward of the first and second ends of the ceiling baffle.

10. The ceiling baffle assembly according to claim 1 wherein the first side portion of the at least one locking piece comprises a first inner edge and wherein the second side portion of the at least one locking piece comprises a second inner edge that faces the first inner edge in a spaced apart manner.

11. The ceiling baffle assembly according to claim 10 wherein the at least one locking piece further comprises:

a first locking edge extending perpendicularly from the first inner edge of the first side portion, and a first inclined edge extending from the first locking edge to a bottom end of the first side portion; and a second locking edge extending perpendicularly from the second inner edge of the second side portion, and a second inclined edge extending from the second locking edge to a bottom end of the second side portion.

12. The ceiling baffle assembly according to claim 1 further comprising:

the ceiling baffle comprising a first inner sidewall extending downwardly from the top wall and being spaced apart from the first outer sidewall and a second inner sidewall extending downwardly from the top wall and being spaced apart from the second outer sidewall; and wherein in the folded state the first and second inner sidewalls are adjacent to one another so that an outer surface of the first inner sidewall is in contact with an outer surface of the second inner sidewall.

13. The ceiling baffle assembly according to claim 1 further comprising:

the ceiling baffle comprising a first end, a second end, and a longitudinal axis extending between the first and second ends;

the top wall of the ceiling baffle comprising a plurality of openings, each of the openings forming one of the one or more insert locations; and wherein the plurality of openings are positioned along the top wall in a spaced apart manner in a direction of the longitudinal axis.

14. The ceiling baffle assembly according to claim 1 wherein the ceiling baffle defines an interior air gap, and wherein the top wall extends from the first outer sidewall to the second outer sidewall to close a top end of the interior air gap, and wherein the one or more insert locations comprise openings in the top wall.

15. A ceiling baffle assembly comprising:

a ceiling baffle that is elongated along a longitudinal axis from a first end to a second end, the ceiling baffle comprising a first sidewall, a second sidewall that is spaced apart from the first sidewall, a bottom wall extending between the first and second sidewalls, and a top wall extending between the first and second sidewalls, the top wall comprising a plurality of openings that are spaced apart from one another in a direction of the longitudinal axis; and a plurality of locking pieces, each of the locking pieces configured to be inserted into one of the plurality of openings in the top wall of the ceiling baffle to hold the first and second sidewalls in position and maintain a shape of the ceiling baffle.

16. The ceiling baffle assembly according to claim 15 wherein each of the plurality of locking pieces is non-integral with the ceiling baffle; wherein the ceiling baffle is formed from a single piece of material that is folded at score lines into the shape of the ceiling baffle, and wherein the plurality of locking pieces are configured to engage the ceiling baffle to prevent the ceiling baffle from unfolding.

17. The ceiling baffle assembly according to claim 15 wherein the ceiling baffle comprises a first end wall located at the first end of the ceiling baffle and a second end wall located at the second end of the ceiling baffle, and wherein each of the plurality of locking pieces is non-integral with the first and second end walls.

18. The ceiling baffle assembly according to claim 15 wherein the ceiling baffle defines a cavity, and wherein the top wall closes a top end of the cavity.

* * * * *